United States Patent [19]

Shiga et al.

[11] Patent Number: 4,533,706
[45] Date of Patent: Aug. 6, 1985

[54] CATALYST AND PROCESS USING SAME FOR PRODUCING OLEFIN POLYMER

[75] Inventors: Akinobu Shiga; Toshio Sasaki; Junpei Kojima, all of Ichihara, Japan

[73] Assignee: Sumitomo Chemical Company, Limited, Osaka, Japan

[21] Appl. No.: 561,324

[22] Filed: Dec. 13, 1983

[30] Foreign Application Priority Data

Dec. 16, 1982 [JP] Japan .................. 57-221659
Dec. 16, 1982 [JP] Japan .................. 57-221660

[51] Int. Cl.$^3$ .................. C08F 4/44; C08F 110/02
[52] U.S. Cl. .................. 526/119; 526/142; 526/151; 526/352; 502/126
[58] Field of Search .................. 526/119, 151, 142; 502/126, 104

[56] References Cited

U.S. PATENT DOCUMENTS 4,210,738 7/1980 Hermans et al. .................. 526/152
4,312,783 1/1982 Sakurai et al. .................. 526/119

FOREIGN PATENT DOCUMENTS 3480 of 1979 Japan .................. 526/119

Primary Examiner—Paul R. Michl
Assistant Examiner—Fred M. Teskin
Attorney, Agent, or Firm—Stevens, Davis, Miller & Mosher

[57] ABSTRACT

A catalyst system for the polymerization of olefins which comprises;
(A) a hydrocarbyloxy group-containing solid catalyst component prepared by (i) reducing a titanium compound represented by the general formula $Ti(OR^1)_n X_{4-n}$ wherein, $R^1$ represents a hydrocarbon radical of 1-20 carbon atoms, X represents a halogen atom, and n represents a number satisfying $0 < n \leq 4$, with an organoaluminum compound represented by the general formula $AlR^2_m Y_{3-m}$ wherein, $R^2$ represents a hydrocarbon radical of 1-20 carbon atoms, Y represents a halogen atom, and m represents a number satisfying $1 \leq m \leq 3$, and (ii) treating the resulting, hydrocarbon solvent-insoluble, hydrocarbyloxy group-containing solid product in a slurry state with an ether compound and titanium tetrachloride at a temperature of 30°–120° C., and
(B) an organoaluminum compound.

18 Claims, No Drawings

CATALYST AND PROCESS USING SAME FOR PRODUCING OLEFIN POLYMER

This invention relates to a novel catalyst system for the polymerization of olefins and a process for producing olefin polymers using the said catalyst system.

It is well known that so-called ziegler-Natta catalysts, which comprise a transition metal compound of Group IV to Group VI and a metal or organometallic compound of Group I to Group III of the periodic table, are generally used for producing olefin polymers.

In particular, titanium trichloride compositions are employed for the industrial production of olefin polymers such as polypropylene, poly(butene-1), and the like.

This production process, however, yields an amorphous polymer in addition to the industrially useful, highly stereospecific olefin polymer. The amorphous polymer is of low value for industrial utilization, and when the produced olefin polymer is used to form articles such as films, fibers, etc., the mechanical properties of the articles are adversely affected to a significant extent by the amorphous polymer contained therein. Additionally, the production of the amorphous polymer causes loss of the raw material monomer and simultaneously makes indispensable a facility for removing the amorphous polymer. These problems are extremely disadvantageous also from the industrial point of view. It will be therefore a very great advantage if such an amorphous polymer is not produced at all or is produced in an extremely limited amount.

On the other hand, residue of the catalyst remains in the olefin polymer obtained by the above polymerization process. This catalyst residue raises various problems with respect to the stability, processability, etc. of the olefin polymer, hence requiring facilities for removing the catalyst residue and for stabilizing the polymer. This disadvantage can be diminished by improving the catalytic activity, which activity is expressed in terms of the weight of polymer produced compared with a unit weight of catalyst. If the catalytic activity is sufficiently improved, the above-mentioned facility for removing the catalyst residue will be unnecessary and the production cost for the olefin polymer may be reduced.

Titanium trichloride, a component of the catalyst, is prepared conventionally from titanium tetrachloride by (1) its reduction with hydrogen followed by ball-milling the product to activate, (2) its reduction with metallic aluminum followed by ball-milling the product to activate, and (3) its reduction with an organoaluminum compound at a temperature between $-30°$ and $30°$ C., followed by heat treatment of the resulting reduced solid at a temperature between $120°$ and $180°$ C. However, the above titanium trichloride is not quite satisfactory in either catalytic activity or stereo-specificity.

Besides the above methods, there have been proposed: a method (Japanese Patent Publication No. 3356/78) comprising a complexing agent treatment of the solid prepared by reducing titanium tetrachloride with an organoaluminum compound, and reacting the treated product with titanium tetrachloride; a method (Japanese Patent Publication No. 3480/79) comprising treatment of the above cited reduced solid with a mixture of a complexing agent and titanium tetrachloride; and a method (Japanese Patent Application Laid-Open Nos. 18608/81 and 20002/81) comprising reducing an alkoxyl group-containing titanium compound with an organoaluminum compound in the presence of an ether compound, adding titanium tetrachloride and an ether compound to form a liquid state titanium composition, followed by heating the composition to deposit a titanium compound.

The present inventors made intensive studies on hydrocarbyloxy group-containing titanium compounds, and have accomplished the present invention through a finding that an improved catalytic activity and a highly stereospecific polymer can be obtained by the polymerization of olefin using an organoaluminum compound and a hydrocarbyloxy group-containing solid catalyst component which is prepared by reducing a titanium compound represented by the general formula Ti(OR$^1$)$_n$X$_{4-n}$ with an organoaluminum compound and treating the resulting solid product with an ether compound and titanium tetrachloride.

An object of this invention is to provide a novel catalyst system for the polymerization of olefins.

Another object of this invention is to provide a process for producing olefin polymers using the above cited novel catalyst system.

Other objects and advantages of this invention will be apparent from the following descriptions.

Thus, according to this invention, there are provided a novel catalyst system using a novel solid catalyst component for polymerizing olefins and a process for producing olefin polymers therewith, characterized in that the solid catalyst component is prepared by reducing a titanium compound represented by the general formula Ti(OR$^1$)$_n$X$_{4-n}$ (R$^1$ represents a hydrocarbon radical of 1-20 carbon atoms, X represents a halogen atom, and n represents a number satisfying $0<n\leq4$) with an organoaluminum compound represented by the general formula AlR$^2_m$Y$_{3-m}$ (R$^2$ represents a hydrocarbon radical of 1-20 carbon atoms, Y represents a halogen atom, and m represents a number satisfying $1\leq m\leq3$) and treating the resulting, hydrocarbon solvent-insoluble, hydrocarbyloxy group-containing solid product in a slurry state with an ether compound and titanium tetrachloride at a temperature of $30°$ to $120°$ C.

Advantageous features of this invention are the high activity of the catalyst, the possibility of a deashing-needless process wherein any step of catalyst residue removal is needless because of the high yields of polymer produced per unit weight of solid catalyst components and per unit weight of titanium, and no step of extracting and removing the amorphous polymer being required because of the high stereospecificity of the produced polymer.

Another advantage of this invention is as follows: The conventional preparation of a highly active titanium trichloride catalyst by reducing titanium tetrachloride with an organoaluminum compound followed by any of various activating treatments, as described in the above Japanese Patent Publication No. 3356/78, needs an expensive refrigeration facility to carry out the reduction at a temperature of $0°$ C. or below. On the contrary, this invention does not need such an expensive refrigeration facility because the reduction of the titanium compound represented by the formula Ti(OR$^1$)$_n$X$_{4-n}$ with an organoaluminum compound is usually accomplished in the temperature range of $10°$ to $80°$ C.

Examples of R$^1$ for the titanium compounds represented by the formula Ti(OR$^1$)$_n$X$_{4-n}$ (R$^1$ is a hydrocarbon radical of 1-20 carbon atoms, X is a halogen atom, and n is a number satisfying $0<n\leq4$) are alkyl groups such as methyl, ethyl, n-propyl, isopropyl, n-butyl, isobutyl, n-amyl, isoamyl, n-hexyl, n-heptyl, n-octyl, n-decyl, and n-dodecyl; aryl groups such as phenyl, cresyl, xylyl, and naphthyl; cycloalkyl groups such as cyclohexyl and cyclopentyl; allyl groups such as 1-propenyl; and aralkyl groups such as benzyl. Among the above groups, particularly preferred are linear alkyl groups of 2–18 carbon atoms and aryl groups of 6–18 carbon atoms. It is also possible to use the titanium compound having two or more different $OR^1$ groups.

Examples of the halogen atoms represented by the letter X are chlorine, bromine, and iodine. Chlorine gives particularly favorable results.

For the preparation of the titanium compound represented by the formula $Ti(OR^1)_nX_{4-n}$ ($0<n\leq 4$), known methods are applicable, including, for example, the method of reacting $Ti(OR^1)_4$ and $TiX_4$ in prescribed proportions and the method of reacting $TiX_4$ and a corresponding alcohol in prescribed proportions.

The value of n in the titanium compounds represented by the general formula $Ti(OR^1)_nX_{4-n}$ satisfies $0<n\leq 4$ as stated above, and preferably $0.3\leq n\leq 4$, most preferably $1\leq n\leq 4$.

Examples of the organoaluminum compounds represented by the general formula $AlR^2{}_mY_{3-m}$ ($R^2$ is a $C_1-C_{20}$ hydrocarbon radical, Y is a halogen atom, and m is a number satisfying $1\leq m\leq 3$), which are used for the reduction, are methylaluminum dichloride, ethylaluminum diohloride, n-propylaluminum dichloride, ethylaluminum sesquichloride, dimethylaluminum chloride, diethylaluminum chloride, di-n-propylaluminum chloride, trimethylaluminum, triethylaluminum, triisobutylaluminum, ethyldicyclo-hexylaluminum, triphenylaluminum, diethylaluminum hydride, diisobutylaluminum hydride, diethylaluminum bromide, and diethylaluminum iodide. Among the above, diethylaluminum chloride and ethylaluminum sesquichloride give particularly favorable results.

Desirably, the reduction is carried out after the titanium compound and organoaluminum compound have been diluted to a concentration of 10–70% by weight with an inert hydrocarbon solvent such as pentane, hexane, heptane, octane, decane, toluene, or decalin.

Suitable temperatures of the reduction are 10° to 80° C., particularly 25° to 70° C. While the reaction period is not particularly restricted, suitable periods thereof are usually 1 to 6 hours.

The molar ratio of the titanium compound to the organoaluminum compound, in the reduction, is 0.3 to 3.0. Favorable results are obtained at ratios of 0.5 to 1.5 moles of diethylaluminum chloride and of 1.5 to 2.5 moles of ethylaluminum sesquichloride, to 1 mole of the titanium compound.

After completion of the reduction, the reaction may be further conducted at a temperature of 30° to 100° C., if necessary.

The hydrocarbon solvent-insoluble, hydrocarbyloxy group-containing solid product obtained by the reduction is separated from the liquid portion, washed several times with an inert hydrocarbon solvent such as pentane, hexane, heptane, octane, decane, toluene, xylene, or decalin, and then reacted with an ether compound and titanium tetrachloride.

Preferred examples of the ether compound are dialkyl ethers such as diethyl ether, di-n-propyl ether, diisopropyl ether, di-n-butyl ether, di-n-amyl ether, diisoamyl ether, dineopentyl ether, di-n-hexyl ether, di-n-octyl ether, methyl n-butyl ether, methyl isoamyl ether, and ethyl isobutyl ether. Among the above, di-n-butyl ether and diisoamyl ether are particularly preferable.

Suitable amounts of the ether compound to be used are 0.1 to 5 moles, particularly 0.3 to 3 moles, for 1 mole of titanium atoms contained in the hydrocarbyloxy group-containing solid product.

Suitable amounts of the titanium tetrachloride to be used are 0.1 to 10 moles, particularly 0.5 to 5 moles, for 1 mole of titanium atoms contained in the solid product, and are 0.5 to 10 moles, particularly 1.5 to 5 moles, for 1 mole of the ether compound used.

The reaction of the hydrocarbon solvent-insoluble, hydrocarbyloxy group-containing solid product with the ether compound and titanium tetrachloride is effected in a slurry state.

Suitable solvents for making up the slurry of the solid product include, for example, aliphatic hydrocarbons such as pentane, hexane, heptane, octane, and decane; aromatic hydrocarbons such as toluene, xylene, and decalin; and alicyclic hydrocarbons such as cyclohexane and methylcyclohexane. Among the above, aliphatic hydrocarbons are particularly preferable.

Favorable concentrations of the slurry are 0.05 to 0.5 g, particularly 0.1 to 0.3 g, of solid/ml of solvent.

Suitable temperatures of this reaction are 30° to 120° C., particularly 45° to 100° C. While the reaction period is not particularly restricted, usually suitable periods are from 30 minutes to 6 hours.

This reaction may be started by either adding the ether compound and titanium tetrachloride to the solid product or, conversely, adding the solid product to a solution of the ether compound and titanium tetrachloride. In the former case, it is preferred to add titanium tetrachloride after addition of the ether compound or to add the ether compound and titanium tetrachloride at the same time.

The solid catalyst component prepared in this invention contains 0.001 to 0.3 mole, preferably 0.002 to 0.15 mole, of hydrocarbyloxy groups per 1 mole of titanium atoms. When the hydrocarbyloxy group content exceeds the above upper limit, the catalytic activity lowers and the stereospecificity of the resulting polymer in the case of α-olefin polymerization lowers as well. Conversely, when the hydrocarbyloxy group content is less than the above lower limit, the catalytic activity in particular is lowered.

The solid catalyst component resulting from the above reaction is separated from liquid, and washed several times with an inert hydrocarbon solvent such as hexane or heptane to become ready for polymerization use.

The organoaluminum compound to be used as another catalyst component is selected from trialkylaluminums, dialkylaluminum halides, dialkylaluminum alkoxides, dialkylaluminum hydrides, dialkylaluminum siloxides, and mixtures of these compounds.

Preferred examples thereof are dimethylaluminum chloride, diethylaluminum chloride, diisobutylaluminum chloride, diethylaluminum bromide, diethylaluminum iodide, trimethylaluminum, triethylaluminum, triisobutylaluminum, diethylaluminum hydride, diethylaluminum ethoxide, and mixtures of these compounds.

The amount of the organoaluminum compound to be used can be chosen within a wide range of from 0.1 to 500 moles per mole of titanium atom contained in the hydrocarbyloxy group-containing solid catalyst component. More suitably, the amount ranges from 0.5 to 200 moles per mole of the titanium atom.

The polymerization can be effected at temperatures ranging from 0° to 300° C. However, suitable temperatures are usually from 0° to 100° C. for the highly stereospecific polymerization of α-olefins such as propylene and the like, for reasons such that at temperatures above 100° C. no highly stereospecific polymer can be obtained.

There is no particular restriction on the polymerization pressure, but pressures of 3 to 2000 atm. are desirable from an industrial and economical point of view.

The polymerization can be carried out either continuously or batchwise.

α-Olefins suitably polymerized in this invention are those having 2 to 10 carbon atoms, including, for example, ethylene, propylene, butene-1, pentene-1, 4-methylpentene-1, and hexene-1. However, this invention is not to be limited to these examples.

According to this invention, either homopolymerization or copolymerization is possible. The copolymerization can be carried out by bringing a mixture of two or more α-olefins into contact with the catalyst system. The heteroblock copolymerization, which comprises two or more steps of polymerization, can also be accomplished with ease.

Polymerization processes applicable in this invention include: slurry polymerization in an inert hydrocarbon solvent such as butane, pentane, hexane, heptane, or octane; solution polymerization, during which the produced polymer is in the state of solution in such an inert hydrocarbon solvent as mentioned above; block polymerization, in which a liquefied monomer is polymerized without using any solvent; and gas phase polymerization, in which a gaseous monomer is polymerized.

For the purpose of regulating the molecular weight of the polymer, a chain transfer agent such as hydrogen can be added to the polymerization system. Moreover, an electron donative compound can also be added with the intention of improving the stereospecificity of the polymer.

This invention is illustrated in more detail below referring to the following Examples. However, the invention is not to be limited thereto.

EXAMPLE 1

(A) Preparation of solid product [reduction product of $Ti(OR^1)_n X_{4-n}$]

A 500-ml (inner volume) flask equipped with a stirrer and a dropping funnel was flushed with argon. Then, 100 g of tetra-o-cresoxytitanium and 250 ml of toluene were placed in the flask and the former was dissolved. A solution of 47.8 ml of ethylaluminum sesquichloride in 100 ml of toluene was slowly added dropwise from the dropping funnel during 2 hours while keeping the temperature in the flask at 60° C. After completion of the addition, the mixture was stirred further at 60° C. for 1 hour. The resulting mixture was allowed to stand at room temperature and separated into solid and liquid portions. The solid was washed repeatedly with n-heptane (each 200 ml×4), and dried under reduced pressure, giving a brown solid product. One gram of this solid product contained 3.8 m moles of titanium and 4.7 m moles of o-cresoxy groups. A Cu-Kα X-ray diffraction pattern of the solid product showed none of the characteristic peaks of titanium trichloride.

(B) Preparation of solid catalyst component

After flushing of a 100-ml flask with argon, 5.8 g of the solid product prepared in (A) above and 29 ml of n-heptane were placed in the flask, and the temperature therein was maintained at 65° C. Then, 4.4 ml of di-n-butyl ether and 5.7 ml of titanium tetrachloride were added in this order and reaction was conducted at 65° C. for 1 hour. The resulting mixture was allowed to stand at room temperature and separated into solid and liquid portions. The solid was washed repeatedly with n-heptane (each 50 ml×4), and dried under reduced pressure, giving a purple solid catalyst component. One gram of this solid catalyst component contained 4.8 m moles of titanium and 0.44 m mole of an o-cresoxy group.

(C) Polymerization of propylene

A 130-ml stainless steel autoclave equipped with a magnetic stirrer was flushed with argon. Then, 250 mg of diethylaluminum chloride, 27.7 mg of the solid catalyst component obtained in (B) above, and 80 ml of liquefied propylene were charged into the autoclave to start polymerization.

The polymerization was continued with stirring at 60° C. for 1 hour. Thereafter, excess propylene was discharged, and the produced polypropylene was air-dried for 24 hours, giving 36.0 g of polypropylene.

Thus, PP/cat [yield(g) of polypropylene based on 1 g of solid catalyst component; hereinafter the same applies] was 1300.

IY (percentage of residue after 6 hours' extraction of product polypropylene powder with boiling n-heptane; hereinafter the same applies) of this polymer was 96.8%.

COMPARATIVE EXAMPLE 1

(A) Preparation of solid catalyst component

A 200-ml flask equipped with a stirrer and a dropping funnel was flushed with argon. Then, 38 ml of n-heptane and 10 ml of titanium tetrachloride were placed in the flask, and the temperature therein was maintained at 50° C. A solution of 20.7 ml of ethylaluminum sesquichloride in 50 ml of n-heptane was slowly added dropwise from the dropping funnel during 90 minutes while keeping the temperature in the flask at 50° C. After completion of the addition, the mixture was heated to 60° C. and stirred for 1 hour. The resulting mixture was allowed to stand at room temperature and separated into solid and liquid portions. The separated solid was washed repeatedly with n-heptane (each 50 ml×5), and dried under reduced pressure, giving a solid product. After flushing of a 100-ml flask with argon, 7.3 g of the solid product and 36.5 ml of n-heptane were placed in the flask, and the temperature therein was maintained at 65° C. Then, 8.0 ml of di-n-butyl ether and 10.4 ml of titanium tetrachloride were added and reaction was conducted at 65° C. for 1 hour. The resulting mixture was allowed to stand at room temperature and separated into solid and liquid portions. The solid was washed repeatedly with n-heptane (each 50 ml×4), and dried under reduced pressure, giving a solid catalyst component, 1 g of which contained 5.46 m moles of titanium.

(B) Polymerization of propylene

Using the solid catalyst component prepared in (A) above, propylene was polymerized in the same manner as in (C) of Example 1, giving PP/cat of 200 and IY of 79.7%.

EXAMPLE 2

A solid catalyst component was prepared in the same manner as in (B) of Example 1, except that the amount of titanium tetrachloride used was changed to 8.6 ml.

One gram of this catalyst component contained 5.7 m moles of titanium and 0.34 m mole of an o-cresoxy group. Using the said catalyst component, propylene was polymerized in the same manner as in (C) of Example 1, giving PP/cat of 1080 and IY of 98.4%.

EXAMPLE 3

A solid catalyst component was prepared in the same manner as in (B) of Example 1, except that the reaction temperature was changed to 75° C. One gram of this catalyst component contained 5.8 m moles of titanium and 0.19 m mole of an o-cresoxy group. Using said catalyst component, propylene was polymerized in the same manner as in (C) of Example 1, giving PP/cat of 1150 and IY of 98.5%.

EXAMPLE 4

After flushing of a 100-ml flask with argon, 6.3 g of the solid product prepared in (A) of Example 1 and 32 ml of n-heptane were placed in the flask, and the temperatue therein was maintained at 30° C. Then, 5.7 ml of diisoamyl ether was added to treat the solid product. After continuation of the treatment for 1 hour at 35° C., 6.2 ml of titanium tetrachloride was added and reaction was conducted at 65° C. for 1 hour. The resulting mixture was allowed to stand at room temperature and separated into solid and liquid portions. The solid was washed repeatedly with n-heptane (each 50 ml×5), and dried under reduced pressure, giving a solid catalyst component, 1 g of which contained 5.3 m moles of titanium and 0.19 m mole of an o-cresoxy group. Using this solid catalyst component, propylene was polymerized in the same manner as in (C) of Example 1, giving PP/cat of 1130 and IY of 97.6%.

EXAMPLE 5

(A) Preparation of solid product

A 300-ml flask equipped with a stirrer and a dropping funnel was flushed with argon. Then, 15 ml of toluene and 15 ml of titanium tetrachloride were placed in the flask, and the temperature therein was maintained at 80° C. A solution of 28.7 ml of o-cresol in 40 ml of toluene was slowly added dropwise from the dropping funnel during 2 hours while keeping the temperature in the flask at 80° C. After completion of the addition, the mixture was further stirred at 80° C. for 1.5 hours. After cooling the inner temperature of the flask to 50° C., a solution of 17 ml of diethylaluminum chloride in 40 ml of n-heptane was slowly added dropwise from the dropping funnel during 2 hours while keeping the temperature in the flask at 50° C. After completion of the addition, the mixture was heated to 60° C. and stirred for 1 hour. The resulting mixture was allowed to stand at room temperature and separated into solid and liquid portions. The solid was washed repeatedly with n-heptane (each 100 ml×6), and dried under reduced pressure, giving a brown solid product. One gram of this solid product contained 4.4 m moles of titanium and 3.6 m moles of an o-cresoxy group. A Cu-Kα X-ray diffraction pattern of the solid product showed none of the characteristic peaks of titanium trichloride.

(B) Preparation of solid catalyst component

A solid catalyst component was prepared in the same manner as in (B) of Example 1, except that 5.8 g of the solid product prepared in (A) above was used. One gram of this solid catalyst component contained 4.7 m mole of titanium and 0.21 m mole of an o-cresoxy group.

(C) Polymerization of propylene

Using the solid catalyst component prepared in the preceding (B), propylene was polymerized in the same manner as in (C) of Example 1, giving PP/cat of 1160 and IY of 97.1%.

EXAMPLE 6

(A) Preparation of solid product

A 500-ml flask equipped with a stirrer and a dropping funnel was flushed with argon. Then, 110 ml of n-heptane and 67 ml of tetra-n-butoxytitanium were placed in the flask, and the temperature therein was maintained at 35° C. A solution of 44.8 ml of ethylaluminum sesquichloride in 108 ml of n-heptane was slowly added dropwise from the dropping funnel during 2 hours while keeping the temperature in the flask at 35° C. After completion of the addition, the mixture was heated to 60° C. and stirred for 1 hour. The resulting mixture was allowed to stand at room temperature and separated into solid and liquid portions. The solid was washed repeatedly with n-heptane (each 100 ml×4), and dried under reduced pressure, giving a reddish brown solid product. One gram of this solid product contained 5.2 m moles of titanium and 7.0 m moles of an n-butoxy group.

(B) Preparation of solid catalyst component

After flushing of a 100-ml flask with argon, 5.4 g of the solid product prepared in the preceding (A) and 27 ml of n-heptane were placed in the flask, and the temperature therein was maintained at 65° C. Then, 4.8 ml of di-n-butyl ether and 15.6 ml of titanium tetrachloride were added and reaction was conducted at 65° C. for 1 hour. The resulting mixture was allowed to stand at room temperature and separated into solid and liquid portions. The solid was washed repeatedly with n-heptane (each 50 ml×4), and dried under reduced pressure, giving a solid catalyst component. One gram of this catalyst component contained 5.4 m moles of titanium and 0.4 m mole of an n-butoxy group.

(C) Polymerization of propylene

Using the solid catalyst component prepared in the preceding (B), propylene was polymerized in the same manner as in (C) of Example 1, giving PP/cat of 730 and IY of 98.5%.

EXAMPLES 7–9

Solid products were prepared in the same manner as in (A) of Example 5, except that the different alcohol and phenols shown in Table 1 were used in place of o-cresol.

Using the above solid products, solid catalyst components were prepared in the same manner as in (B) of Example 1, except that the reaction temperature was changed to 75° C.

Using the above solid catalyst components, polymerization of propylene were conducted in the same manner as in (C) of Example 1. Results thereof are summarized in Table 1.

TABLE 1

| Example No. | Alcohol | Amount of alcohol used (ml) | PP/cat | IY (%) |
|---|---|---|---|---|
| 7 | n-Decyl alcohol | 52 | 1050 | 98.6 |
| 8 | Phenol | 24 | 994 | 98.0 |
| 9 | p-Cresol | 28.5 | 1070 | 94.7 |

EXAMPLE 10

Ethylene and butene-1 were copolymerized using the solid catalyst component prepared in Example 6. After flushing with argon of a 130-ml stainless steel autoclave equipped with a magnetic stirrer, 70 ml of an isoparaffin hydrocarbon solvent (Goods name: IP solvent 2028, made by Idemitsu Petrochem. Co., Ltd.) and 32.5 mg of triethylaluminum were charged at 190° C. in the autoclave. Then, an ethylene-butene-1 gas mixture (butene-1 concentration, 25 wt %) was fed into the autoclave to dissolve in the solvent, and thereafter 15.7 mg of said solid catalyst component was added. The copolymerization was conducted at 190° C. for 1 hour while supplying the same gas mixture so as to keep the total pressure at 6 kg/cm². Then, unreacted monomers were purged, and 1 ml of n-decyl alcohol was added. The produced polymer was suspended in a large quantity of methanol and, after being separated from liquid, was dried under reduced pressure at 70° C. for 6 hours. Thus, 2.51 g of an ethylene-butene-1 copolymer was obtained. PE/cat [yield (g) of ethylene-butene-1 copolymer based on 1 g of solid catalyst component; hereinafter the same applies] of the copolymer was 160. Infrared absorption spectrometry indicated that this copolymer contained 21.3 ethyl groups per 1000 carbon atoms and hence the butene-1 content in the copolymer was 8.5 wt %.

COMPARATIVE EXAMPLE 2

Using the solid catalyst component prepared in Comparative Example 1, ethylene and butene-1 were copolymerized in the same manner as in Example 10. The results showed that the catalytic activity, i.e. PE/cat was 24, and the butene-1 content in the copolymer was 4.8 wt %.

EXAMPLE 11

Using the solid catalyst component prepared in Example 5, ethylene and butene-1 were copolymerized in the same manner as in Example 10. The results indicated that PE/cat was 146 and butene-1 content in copolymer was 8.1 wt %.

EXAMPLE 12

Propylene-ethylene block copolymerization

After flushing with argon of a 5-l stainless steel autoclave of agitating type, 45.9 mg of the solid catalyst component prepared in Example 4 and 3.0 g of diethylaluminum chloride were charged therein, and hydrogen was added in an amount corresponding to a partial pressure of 0.79 kg/cm². Then, 1.3 kg of liquefied propylene was introduced with pressure into the autoclave and polymerized at 60° C. for 1 hour. Thereafter, unreacted monomer was purged and the autoclave was flushed with argon. Hydrogen was added again in an amount corresponding to a partial pressure of 0.15 kg/cm² and propylene gas was then fed to a total pressure of 8.0 kg/cm². Subsequently, ethylene gas was fed to a total pressure of 10 kg/cm². Thus, gas phase copolymerization of ethylene and propylene was conducted for 2.3 hours while supplying an ethylene-propylen (50:50 by volume) gas mixture so as to keep the total pressure at 10 kg/cm². Thereafter, unreacted monomers were purged and 183 g of a propylene-ethylene block copolymer was obtained, which had good powder quality. This propylene-ethylene block copolymer consisted of 43 wt % of propylene homopolymer and 57 wt % of propylene-ethylene copolymer.

What is claimed is:

1. A catalyst system for the polymerization of olefins which comprises:

(A) a hydrocarbyloxy group-containing solid catalyst component, said component being prepared by (i) reducing a titanium compound represented by the general formula $Ti(OR^1)_n X_{4-n}$ wherein, $R^1$ represents a hydrocarbon radical having 1-20 carbon atoms, X represents a halogen atom, and n represents a number satisfying $0.3 \leq n \leq 4$, with an organoaluminum compound represented by the general formula $AlR^2_m Y_{3-m}$ wherein, $R^2$ represents a hydrocarbon radical having 1-20 carbon atoms, Y represents a halogen atom, and m represents a number satisfying $1 \leq m \leq 3$, in the absence of ether and (ii) treating the resulting, hydrocarbon solvent-insoluble, hydrocarbyloxy group-containing solid product in a slurry state with an ether compound and titanium tetrachloride at a temperature of 30° to 120° C., and (B) an organoaluminum compound.

2. The catalyst system of claim 1, wherein n of the general formula $Ti(OR^1)_n X_{4-n}$ satisfies $1 \leq n \leq 4$.

3. The catalyst system of claim 1, wherein X of the general formula $Ti(OR^1)_n X_{4-n}$ is chlorine.

4. The catalyst system of claim 1, wherein $R^1$ of the general formula $Ti(OR^1)_n X_{4-n}$ is a linear alkyl radical having 2-18 carbon atoms and/or an aryl radical having 6-18 carbon atoms.

5. The catalyst system of claim 1, wherein the ether compound is a dialkyl ether.

6. The catalyst system of claim 1, wherein the amount of the ether compound used for the treatment is 0.1 to 5 moles per 1 mole of titanium contained in said solid product.

7. The catalyst system of claim 1, wherein the amount of titanium tetrachloride used for the treatment is 0.1 to 10 moles per 1 mole of titanium contained in said solid product.

8. The catalyst system of claim 1, wherein the hydrocarbyloxy group content in the solid catalyst component is 0.001 to 0.3 mole per 1 mole of titanium contained therein.

9. The catalyst system of claim 1, wherein the reduction of the titanium compound represented by the general formula $Ti(OR^1)_n X_{4-n}$ with an organoaluminum compound represented by the general formula $AlR^2_m Y_{3-m}$ is carried out at a temperature of 10° to 80° C.

10. A process for producing olefin polymers using a catalyst system which comprises (A) a hydrocarbyloxy group-containing solid catalyst component, said component being prepared by (i) reducing a titanium compound represented by the general formula $Ti(OR^1)_n X_{4-n}$ wherein, $R^1$ represents a hydrocarbon radical having 1-20 carbon atoms, X represents a halogen atom, and n represents a number satisfying $0 < n \leq 4$, with an organoaluminum compound represented by the general formula $$AlR^2_m Y_{3-m}$$

wherein, $R^2$ represents a hydrocarbon radical having 1-20 carbon atoms, Y represents a halogen atom, and m represents a number satisfying $1 \leq m \leq 3$, in the absence of ether and (ii) treating the resulting, hydrocarbon solvent-insoluble, hydrocarbyloxy group-containing solid product in a slurry state with an ether compound and titanium tetrachloride at a temperature of 30-120° C., and (B) an organoaluminum compound.

11. The process of claim 10, wherein n of the general formula $Ti(OR^1)_n X_{4-n}$ satisfies $1 \leq n \leq 4$.

12. The process of claim 10, wherein X of the general formula $Ti(OR^1)_n X_{4-n}$ is chlorine.

13. The process of claim 10, wherein $R^1$ of the general formula $Ti(OR^1)_n X_{4-n}$ is a linear alkyl radical having 2-18 carbon atoms and/or an aryl radical having 6-18 carbon atoms.

14. The process of claim 10, wherein the ether compound is a dialkyl ether.

15. The process of claim 10, wherein the amount of the ether compound used for the treatment is 0.1 to 5 moles per 1 mole of titanium contained in said solid product.

16. The process of claim 10, wherein the amount of titanium tetrachloride used for the treatment is 0.1 to 10 moles per 1 mole of titanium contained in said solid product.

17. The process of claim 10, wherein the hydrocarbyloxy group content in the solid catalyst component is 0.001 to 0.3 mole per 1 mole of titanium contained therein.

18. The process of claim 10, wherein the reduction of the titanium compound represented by the general formula $Ti(OR^1)_n X_{4-n}$ with an organoaluminum compound represented by the general formula $AlR^2_m Y_{3-m}$ is carried out at a temperature of 10° to 80° C.

* * * * *